United States Patent
Wu

(10) Patent No.: US 7,187,634 B2
(45) Date of Patent: Mar. 6, 2007

(54) CONTROL CIRCUIT FOR OPTICAL RECORD MEDIUM PROCESSING DEVICE AND METHOD THEREOF

(75) Inventor: Chien-Te Wu, Ilan (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 780 days.

(21) Appl. No.: 10/646,804

(22) Filed: Aug. 25, 2003

(65) Prior Publication Data

US 2004/0218513 A1 Nov. 4, 2004

(30) Foreign Application Priority Data

Apr. 15, 2003 (TW) .............................. 92108643 A

(51) Int. Cl.
*G11B 5/09* (2006.01)
(52) U.S. Cl. .................. 369/47.5; 369/47.1; 369/53.11

(58) Field of Classification Search .................... None
See application file for complete search history.

(56) References Cited

U.S. PATENT DOCUMENTS

2002/0034141 A1* 3/2002 Kaku ...................... 369/53.24
2003/0227847 A1* 12/2003 Minabe et al. ........... 369/53.27

* cited by examiner

*Primary Examiner*—Muhammad Edun
(74) *Attorney, Agent, or Firm*—Harness, Dickey & Pierce, P.L.C.

(57) ABSTRACT

A control circuit for an optical record medium processing device and a method of controlling the optical record medium processing device are implemented in a computer system in both power-on and power-off status. The control circuit provides a control signal to enable the optical record medium processing device to automatically respond to the control signal and work correspondingly, regardless of whether the computer system is powered or not.

9 Claims, 6 Drawing Sheets

CONTROL CIRCUIT FOR OPTICAL RECORD MEDIUM PROCESSING DEVICE AND METHOD THEREOF

BACKGROUND OF THE INVENTION

1. Field of Invention

The invention relates to a control circuit, and more particularly to a control circuit implemented in a desktop or laptop computer to operate an optical medium.

2. Related Art

Current commercially available optical record medium processing devices such as CD-ROM drives have various functions, operation speeds and specifications. An optical record medium processing device known in the art may be classified as two types of apparatus, e.g. a read only memory (ROM) type optical record medium processing device and a writable/rewritable (R/RW) type optical record medium processing device. A compact disc (CD) has a capacity smaller than that of a digital versatile disc (DVD). The optical record medium processing device is, for example, a CD-ROM drive, a CD-R/RW (CD-RW) drive, a DVD-ROM drive, a DVD-RAM drive, a DVD+RW drive, a Combo drive, a Slim ROM drive, a DVD-Multi drive, a DVD Player, a DVD–RW drive or a PS2/XBOX CD-ROM drive.

Current developments have increasingly turned the personal computer into a personal digital video/audio center with high audio-video performance. If the audio-video function can be carried out without booting the computer, it would be very convenient for use and would provide another important use for the computer.

A portable computer with a low power CD-Player, which is used in the control of the CD-ROM drive without booting the computer has been disclosed. A specific application through a switch module when the computer host is in power-off or power-saving status is also disclosed. The above improvements are applicable to laptop computers using a battery as the main power supply. Therefore, even when the computer is not powered, the battery still keeps supplying power to the subsystems.

However, the desktop computer is powered by means of a power supply that converts an alternating current to a direct current. If the computer is shut off, the power supply then cannot offer sufficient power to operate the computer. Therefore, the computer has to be powered on just for listening to music.

SUMMARY OF THE INVENTION

The object of the invention is therefore to provide a control circuit for an optical record medium processing device that can operate regardless of whether the computer host is powered on/off.

In order to achieve the above and other objectives, a control circuit for an optical record medium processing device according to the invention is mounted in a computer system and operates in both power-on and power-off status of the computer host. The computer host has a power supply capable of converting an alternating current to a direct current, and outputting the direct current to keep supplying power when the host is not powered. A command generator unit distributes an operation signal regardless of whether the host is powered on/off.

A logic unit receives the operation signal and generates a control signal in response to the operation signal.

The circuit of the invention has a power control unit to supply the subsystems such as the command generator unit and the logic unit with the power required for normal operation even when the host is not powered. Thereby, the optical record medium processing device automatically responds to the control signal and works correspondingly.

The circuit of the invention enables the operation of the subsystems even when the host is not powered or even when control buttons which are mounted on external surfaces of the optical record medium processing device are shielded.

The control circuit of the invention performs functions corresponding to the control buttons mounted on the optical record medium processing device. When one of the control buttons is pressed, the corresponding signal is transmitted to the host to perform the corresponding task. Therefore, it provides broad compatibility with various types of control panels for the optical record medium processing device, usually made by different manufacturers.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
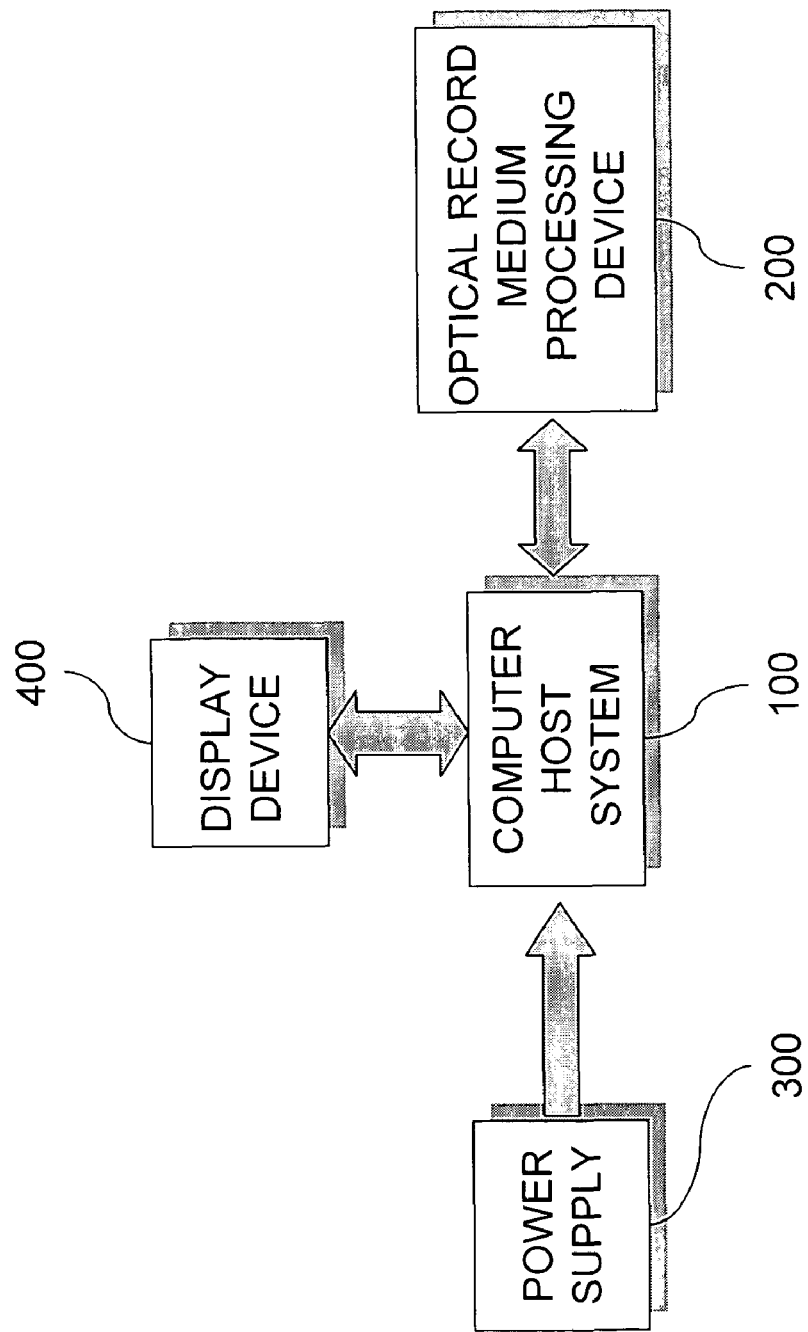
FIG. 1 is a block diagram illustrating the architecture of a control circuit for an optical record medium processing device according to one embodiment of the invention, suitable for a data processing system.

FIG. 1 is a block diagram illustrating the architecture of a control circuit for an optical record medium processing device according to one embodiment of the invention, particularly suitable for an information processing system. As illustrated, a computer host system 100 includes a data processing device, a CPU, a RAM and various integrated circuits. Various data buses, such as a PCI bus, an ISA bus, an IDE bus and an SM bus are provided to connect subsystems in the host system 100 (such as an optical record medium processing device 200 of FIG. 1, a floppy disk drive, a hard disk drive, an optical disc burner) to one another. A display device 400 is used to display a display signal outputted from the host system 100.

The host system 100 includes a power supply 300 that supplies the host system 100 and the subsystems with a direct current converted from an alternative current of, for example, 110 or 220 Volts. The host system 100 has at least two statuses of power-on and power-off.

In power-on status, the power supply 300 outputs the direct current to the host system 100 and the subsystems. In power-off status, the power supply 300 does not supply direct current to the host system 100. Instead, the direct current is supplied to only the subsystems such as the optical record medium processing device 200. That is, when the host system 100 is in power-on status, it is booted and an inwardly installed operation system works. When the host system is in power-off status, the host system is shut off and the operation system does not work.

Therefore, even when the host system 100 is in power-off status, a control circuit for the optical record medium processing device according to the invention enables the computer to be used as a personal video/audio multi-media center.

The power supply 300 can be, for example, a power supply of model No. ENP-2920 from Enhance Electronics, or FSP250-60MS (PF) from SPI Electronic Co., Ltd. of FSP.

Figure 2:
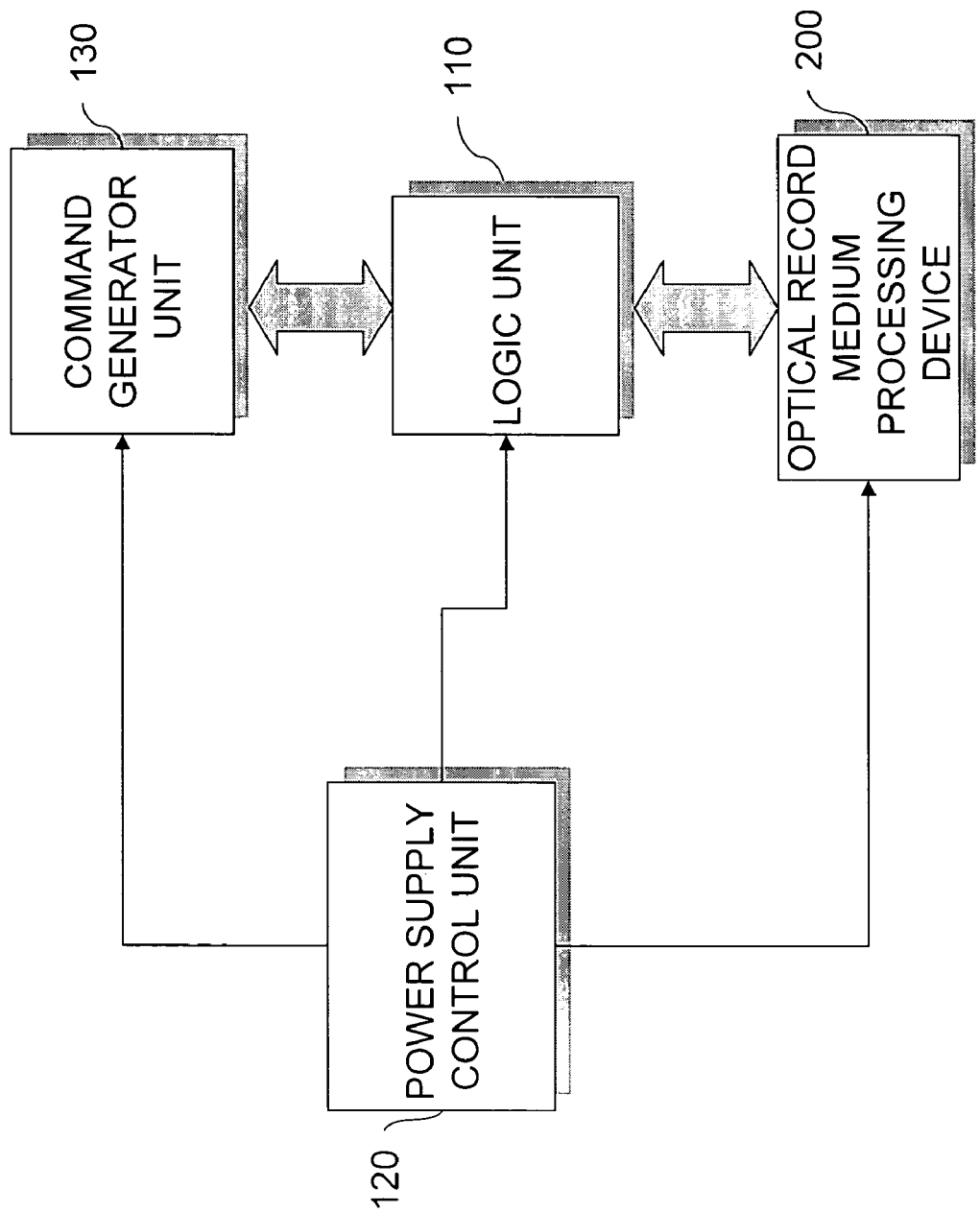
FIG. 2 is a block diagram schematically illustrating the architecture of a control circuit for an optical record medium processing device according to a first embodiment of the invention.

FIG. 2 is a block diagram schematically illustrating the architecture of a control circuit for an optical record medium processing device according to a first embodiment of the invention. The apparatus of the invention includes a logic unit 110, a power supply control unit 120 and a command generator unit 130.

The command generator unit 130 is coupled with the logic unit 110 through a data bus to provide the logic unit 110 with an operation signal such as, WITHDRAW, PLAY, FORWARD and BACKWARD signals. Thereby, the optical record medium processing device automatically responds to the operation signal in both power-on and power-off status and works correspondingly.

The command generator unit 130 includes a micro-controller that is provided with a plurality of control buttons. When the user presses one of the control buttons, such as the PLAY button, the micro-controller distributes a corresponding signal to the logic unit 110 to enable playing of an optical record medium in the optical record medium processing device 200.

The logic unit 110 mainly includes a south bridge chip that communicates with peripherals after receiving the command for the CPU. Usually, a control processor and chips communicating with the peripherals on a motherboard are designated as a set of logic units or chipset. The chipset usually includes a north bridge chip and a south bridge chip. The north bridge chip is located closest to the processor, while the south bridge chip is far away from the processor. The peripherals may include a PCI interface, an IDE controller for a hard disk or a DVD ROM drive, an USB controller, a floppy disk drive, a keyboard, and a mouse.

The power supply control unit 120 supplies a direct current of 3 or 5 Volts to the logic unit 110 and the command generator unit 130 when the host system is in power-off status. When the host system is in power-off status, the power supply 300 supplies a direct current of 12 Volts to the optical record medium processing device 200.

Figure 3:
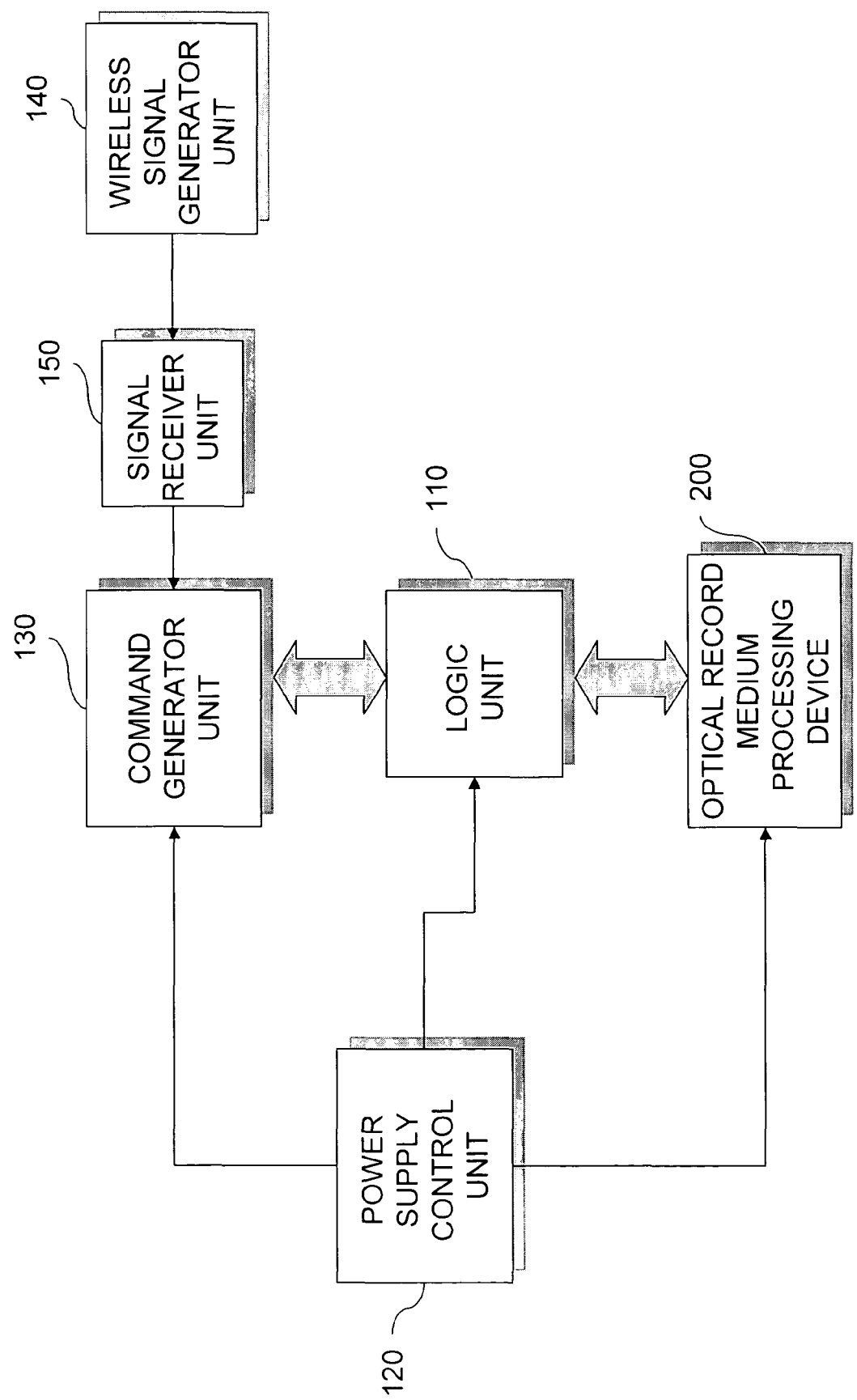
FIG. 3 is a block diagram schematically illustrating the architecture of a control circuit for an optical record medium processing device according to a second embodiment of the invention.

FIG. 3 is a block diagram schematically illustrating the architecture of a control circuit for an optical record medium processing device according to a second embodiment of the invention. The architecture of the second embodiment is similar to that of the first embodiment, except that a remote controller controls the optical record medium processing device according to the second embodiment of the invention. As illustrated, when the user presses a control button such as the PLAY button on a wireless signal generator unit 140, the wireless signal generator unit 140 generates a corresponding wireless signal that is transmitted as an IR or RF signal. A signal receiver unit 150 receives the wireless signal and delivers it to the command generator unit 130.

Ejection and play operations of an optical record medium processing device such as a compact disk (CD) drive are respectively controlled by an EJECTION button and a PLAY button mounted on a front panel. Since each type of CD-ROM drive has its own specifications, the locations of the control buttons may differ from one to another. If the CD-ROM drive is mounted inside the host system, the control buttons on the CD-ROM drive are shielded by a front lid and thus are not convenient for use.

If the control panel of the CD-ROM drive is mounted inside the host system, the control buttons are designed to be externally exposed or a slidable cover is further provided to prevent the control buttons from being shielded.

Therefore, according to the architecture of the invention, regardless of whether the control buttons of the CD-ROM drive are shielded, the operation of the CD-ROM drive is convenient with the optical record medium processing device of the invention.

Figure 4:
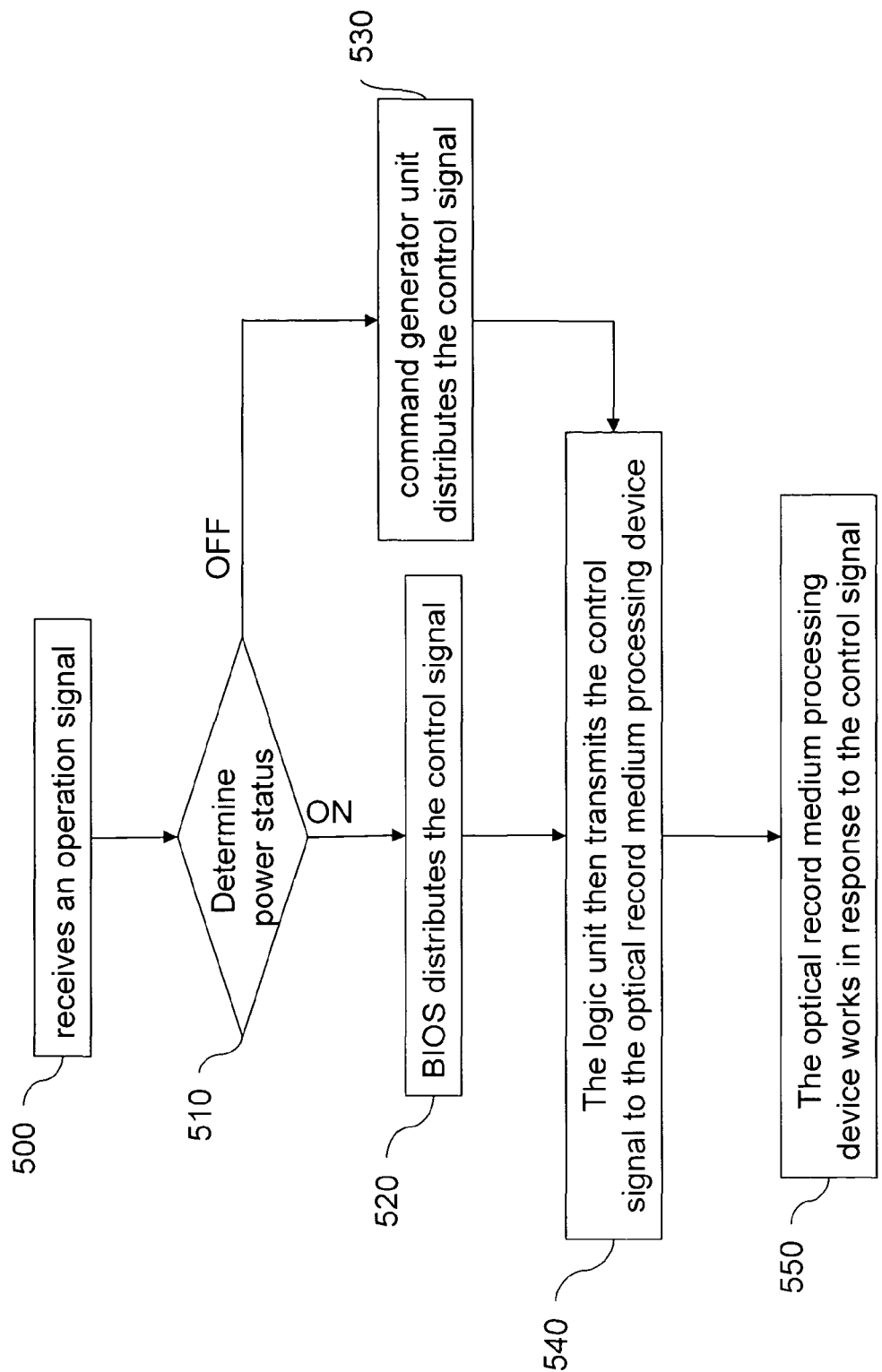
FIG. 4 is a flow chart illustrating the operation of an optical record medium processing device according to one embodiment of the invention.

FIG. 4 is a flow chart illustrating the operation of an optical record medium processing device according to one embodiment of the invention. First, a micro-controller receives an operation signal (step 500). The power supply status of the computer host (step 510) is then determined to assign the BIOS or the command generator unit to distribute a control signal response to the operation signal. If the host is powered on, the BIOS then distributes the control signal (step 520). If the host is not powered on, the command generator unit then distributes the control signal (step 530). The logic unit then transmits the control signal to the optical record medium processing device (step 540). The optical record medium processing device works in response to the control signal (step 550).

Figure 5A:
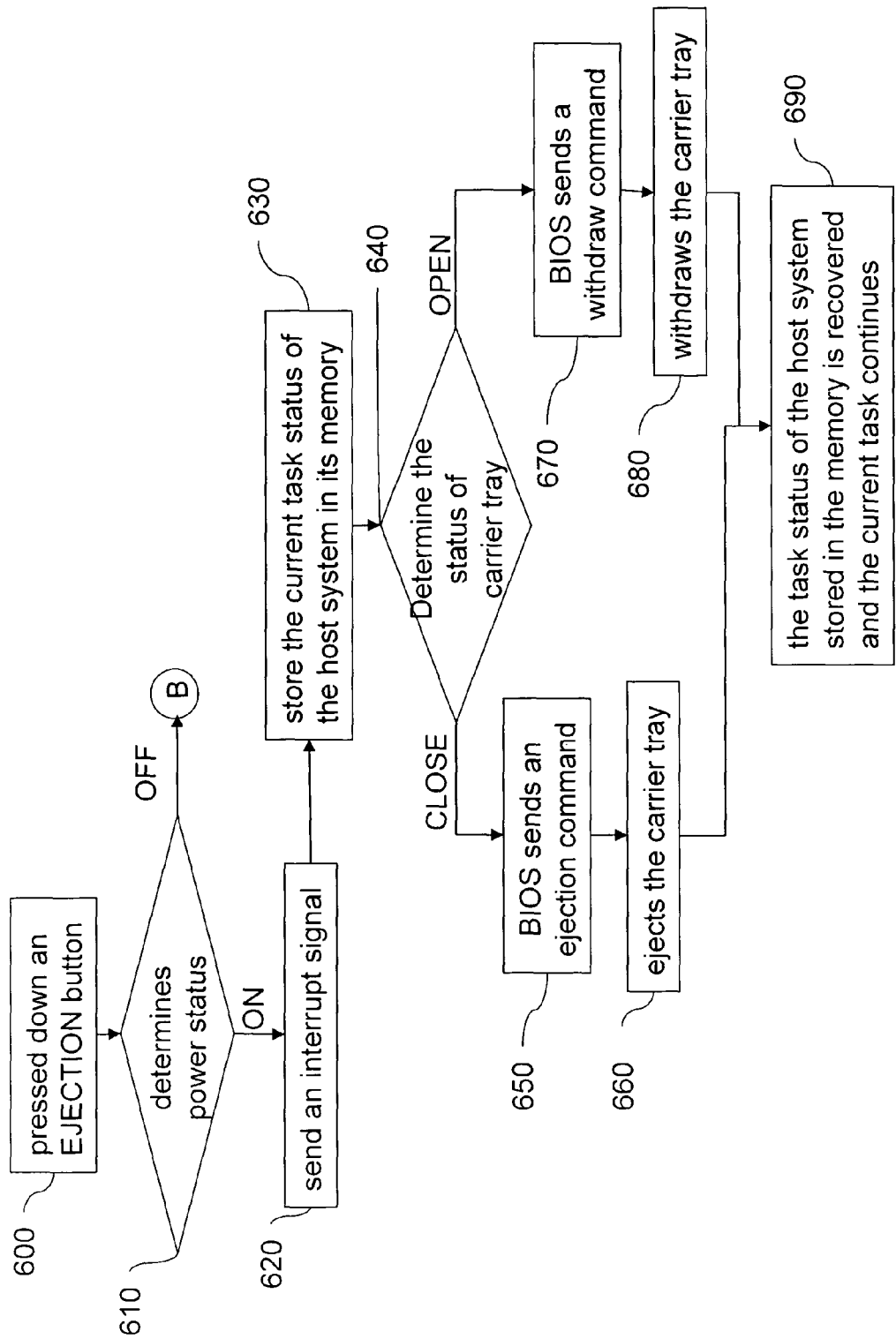
FIGS. 5A to 5B illustrate a method of controlling an optical record medium processing device according to a preferred embodiment of the invention.
Figure 5B:
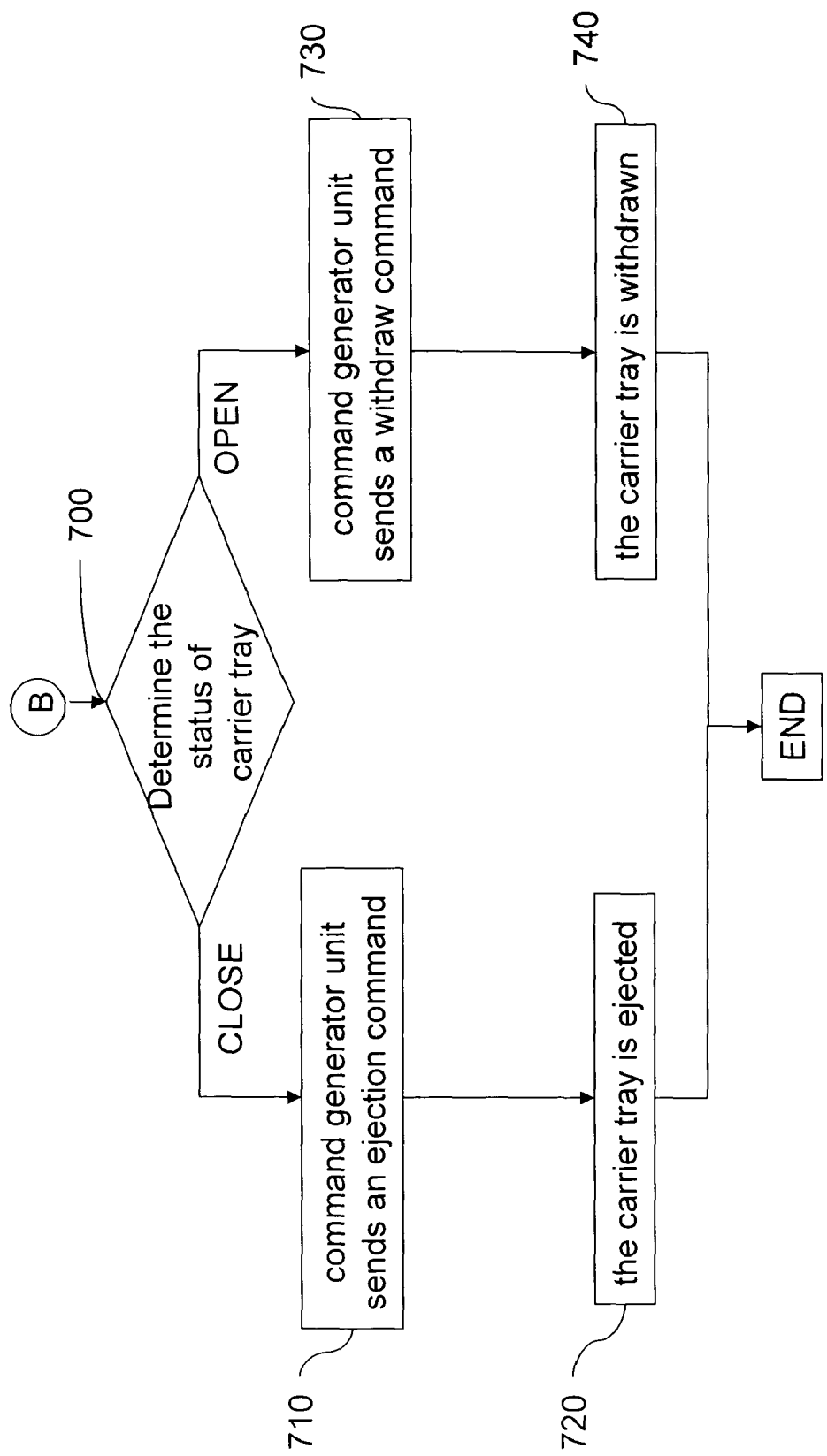

The above process is further described with reference to an example in which the user presses down the EJECTION button. FIGS. 5A to 5B illustrate a method of controlling an optical record medium processing device according to a preferred embodiment of the invention.

When the user pressed down an EJECTION button (step 600), the micro-controller in the command generator unit 130 receives the ejection operation signal and at the same time determines the power supply status of host system (step 610). When the host system is in power-on status, which is the case when the power supply 300 outputs a direct current to the host system, a system management bus sends an interrupt signal (step 620) and the BIOS stores the current task status of the host system in its memory (step 630). A carrier tray of the optical record medium processing device 200 may be either opened or closed (step 640). If the carrier tray is closed, the BIOS then sends an ejection command (step 650). The optical record medium processing device 200 ejects the carrier tray (step 660). If the carrier tray is open, the BIOS then sends a withdraw command (step 670) and withdraws the carrier tray (step 680). Finally, the task status of the host system stored in the memory is recovered and the current task continues (step 690).

Therefore, if the system host is in power-on status, when the user wants to retrieve an optical medium from the carrier tray or place the optical medium in the carrier tray, steps 600~660 are executed in sequence. The carrier tray is thereby ejected. After the optical medium is taken or placed, steps 600, 610, 620, 630, 670 and 680 are executed to withdraw the carrier tray.

If the system host is in power-off status, the power supply 300 outputs a direct current of 12 Volts to the optical record medium processing device 200. The command generator unit 130 and the logic unit 110 are supplied with the direct current required for a normal operation from the power supply control unit 120. Then, it is determined whether the carrier tray of the optical record medium processing device 200 is open or closed (step 700). If the carrier tray is closed, the command generator unit 130 sends an ejection command (step 710) and the carrier tray of the optical record medium processing device is ejected (step 720). If the carrier tray is open, the command generator unit 130 sends a withdraw command (step 730) and the carrier tray of the optical record medium processing device 200 is withdrawn (step 740).

Therefore, in power-off status of the host system, when the user wants to place the optical medium in or retrieve it from the carrier tray, steps 600, 610, 700, 710, and 720 are executed to eject the carrier tray. Thereafter, the EJECTION button is pressed again, and then steps 600, 610, 700, 730 and 740 are sequentially repeated to withdraw the carrier tray.

The optical record medium processing device and the method of controlling the optical record medium processing device according to the invention are useful in both powered-on and power-off status of the host system. The manipulation of the optical medium is controlled directly by means of the optical record medium processing device of the invention, rather than through an interface or control panel.

It will be apparent to a person skilled in the art that the invention as described above may be varied in many ways. Such variations are not to be regarded as a departure from the spirit and scope of the invention, and all such modifications as would be obvious to one skilled in the art are intended to be included within the scope of the following claims.

What is claimed is:

1. A control circuit for an optical record medium processing device mounted in a computer host, the computer host having a power supply capable of converting an alternating current to a direct current and outputting the direct current at both power-on and power-off statuses of the computer host, such that the optical record medium processing devicen operates at both power-on and power-off statuses of the computer host, the control circuit comprising:
    a command generator unit, distributing an operation signal regardless of whether the computer host is at a power-on or power-off status;
    a logic unit, coupled to the command generator unit through a system management bus to receive the operation signal and distribute a control signal in response to the operation signal;
    a power supply control chip, respectively coupled with the command generator unit and the logic unit to provide required power for a normal operation of the command generator unit and the logic unit at a power-off status of the computer host;
    wherein the optical record medium processing device automatically responds to the control signal and works correspondingly at both powered-on and power-off statuses of the computer host.

2. The control circuit of claim 1, wherein the logic unit is a south bridge chip.

3. The control circuit of claim 1, wherein the command generator unit at least includes a micro-processor.

4. The control circuit of claim 3, wherein the command generator unit further includes a signal receiver unit for receiving a wireless signal.

5. The control circuit of claim 4, wherein the wireless signal is transmitted by a wireless signal generator unit.

6. A method of controlling an optical record medium processing device, suitable for a computer host, the computer host having a power supply capable of converting an alternating current to a direct current and outputting the direct current at both power-on and power-off statuses of the computer host to enable a normal operation of the optical record medium processing device, the method comprising:
    receiving an operation signal by a command generator unit;
    determining the power supply status of the computer host and distributing a control signal in response to the operation signal;
    outputting a control signal to the optical record medium processing device from a logic unit, thereby the optical record medium processing device automatically responds to the control signal and works correspondingly.

7. The method of claim 6, wherein if the computer host is at the power-on status in the step of determining the power supply status, then further generating an interrupt signal and storing the current task status of the computer host.

8. The method of claim 6, wherein if the host is at a power-off status in the step of determining the power supply status, then BIOS of the computer host distributes the control signal.

9. The method of claim 6, wherein when the host is at a power-off status, the control signal is sent from the command generator unit.

* * * * *